3,364,266
OXIDATION OF 1,5-CYCLOOCTADIENE

William J. Farrissey, Jr., Northford, Conn., and Leroy C. Jennings, Baytown, Tex., assignors, by mesne assignments, to Esso Research and Engineering Company, Elizabeth, N.J., a corporation of Delaware
No Drawing. Filed Dec. 16, 1963, Ser. No. 330,609
5 Claims. (Cl. 260—610)

The present invention is directed to the oxidation of 1,5-cyclooctadiene. More particularly, the invention is concerned with the hydroperoxides formed in the air oxidation of 1,5-cyclooctadiene. In its more specific aspects, the present invention is directed to the products obtained in the oxidation with molecular oxygen of 1,5-cyclooctadiene, such as 3-hydroperoxy-1,5-cyclooctadiene and 6-hydroperoxy-1,4-cyclooctadiene.

The present invention may be briefly described as the oxidation with molecular oxygen of 1,5-cyclooctadiene to obtain useful unsaturated peroxidic materials which are useful as chemical intermediates as well as having useful properties in and of themselves. The oxidation is carried out with molecular oxygen in the presence of azoisobutyronitrile at a temperature within the range of about 50° to about 80° C. The oxidation reaction may be carried out in the presence of a solvent and by using an initiator although it is not necessary. The oxidation reaction yields the unsaturated hydroperoxides and a peroxidic oil.

The oxidation is preferably carried out by bubbling oxygen through the 1,5-cyclooctadiene in a solution of benzene or decane and in the presence of azoisobutyronitrile at a temperature of about 60° C. The use of an initiator which produces free radicals at the operating temperatures, such as azoisobutyronitrile, hastens the uptake of oxygen and reduces or eliminates an induction period. Other initiators may be used, such as benzoylperoxide and t-butyl peracetate; however, the initiator selected should be such that metals are not introduced into the system.

The solvent is used as a means for conveniently handling the 1,5-cyclooctadiene. Suitable solvents are selected for ease of separating the unreacted 1,5-cyclooctadiene and the resulting products of the oxidation. The solvents necessarily are inert to oxygen at the operating temperatures. Suitable solvents are octane, benzene and the like.

The oxidation reaction of the present invention may be pictorially illustrated as follows:

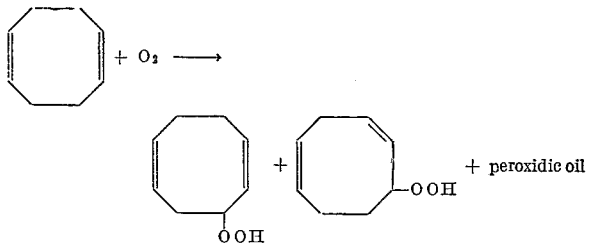

It can be seen from the foregoing that two hydroperoxide isomers are formed, namely 3-hydroperoxy-1,5-cyclooctadiene and 6-hydroperoxy-1,4-cyclooctadiene, which can be separated from a peroxidic oil. The two hydroperoxides are recovered from the peroxidic oil by a mixed solvent technique wherein the hydroperoxides are selectively dissolved into the solvent whereas the peroxidic oil is insoluble. Although other mixtures may be used, a mixture of an excess of petroleum ether and benzene has been found to be effective to selectively dissolve the two hydroperoxides. The hydroperoxides are recovered in pure form by removing the solvent by evaporation or some equivalent manner.

The hydroperoxides of the present invention are useful compositions of matter as intermediates in the preparation of various useful known compounds. For example, the hydroperoxides either taken singly or as a mixture may be hydrogenated to form cyclooctanol. The hydrogenation is accomplished by adding hydrogen to the hydroperoxides in the presence of a hydrogenation catalyst, such as platinum oxide at atmospheric pressure. The resulting cyclooctanol is a known useful compound which may be oxidized with oxygen or with acidic dichromate to form cyclooctanone which is used to form the lactam, the lactam being the nylon 8 precursor.

The peroxidic oil of the present invention is useful as a drying oil in paint and varnish coating compositions and in polyester formulations. Furthermore, the peroxidic oil can be hydrogenated, as will be described in more detail hereinafter, to obtain cyclic glycols which are used in polyester applications.

The peroxidic oil may be characterized by the following formula:

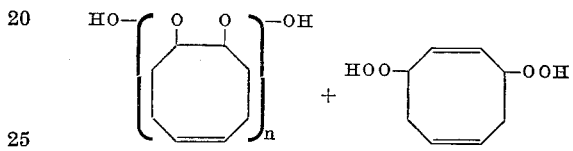

$n=1$ to 4.

Thus, the peroxidic oil is a mixture of dihydroperoxides and polyperoxides. Upon hydrogenation of the peroxidic oil at 100–150 p.s.i.g. hydrogen pressure at ambient temperature, a mixture of diols was produced. Complete hydrogenation was achieved by atmospheric reduction with platinum-on-carbon catalyst. From the mixture, 1,2-dihydroxycyclooctane and 1,4-dihydroxycyclooctane were recovered. These diols are useful polyester compounds.

The present invention is further illustrated by the following examples which are set forth to illustrate and not to limit the present invention.

Example 1

In a one-liter flask equipped with condenser, high speed stirrer, oxygen-inlet tube and thermowell were placed 200 cc. (176.6 g., 1.63 moles) of cis,cis-1,5-cyclooctadiene and 0.4 g. of azoisobutyronitrile. The solution was heated to 60° C. and pure oxygen gas admitted. Oxidation was continued until 4.23 liters (0.19 mole, 11.7%) of oxygen had been absorbed. Unreacted olefin was removed by vacuum evaporation at 40° C. after which there remained 25.52 g. of a thick viscous oil. The oil was separated into hydroperoxide and peroxidic oil components by treatment with petroleum ether-benzene mixtures. On addition of 204 cc. of petroleum ether and 41 cc. of benzene and cooling to −5° C., two layers were formed. The upper layer was decanted and solvent evaporated from it to yield 12.37 g. (0.088 mole, 46%) of hydroperoxide. The insoluble peroxidic oil material weighed 12.42 g. (0.089 mole, 47%). Upon analysis of the hydroperoxide material, 3-hydroperoxy-1,5-cyclooctadiene and 6-hydroxyperoxy-1,4-cyclooctadiene were found.

Example 2

In apparatus as in Example 1 were placed 100 cc. of cyclooctadiene in 50 cc. of octane. The reactants were maintained at a temperature between 70 and 75° C. during which time 5.1 liters of oxygen were absorbed in about 320 minutes. The crude reaction product was extracted with cold (0° C.) 0.2 N NaOH and thereafter acidified with $CO_2$. The hydroperoxides, 3-hydroperoxy-1,5-cyclooctadiene and 6-hydroperoxy-1,4-cycclooctadiene, were recovered by ether extraction.

Example 3

One hundred grams of cyclooctadiene were placed in a reaction vessel. Oxygen was introduced at a temperature of 76° C. for about 90 minutes and at 60° C. for about 64 minutes wherein 5.04 liters of oxygen were absorbed. The crude product obtained was treated with 250 cc. of petroleum ether and 50 cc. of methanol. This mixture was cooled in an ice bath, and the solvents were decanted leaving peroxides. The hydroperoxides, 3-hydroperoxy-1,5-cyclooctadiene and 6-hydroperoxy-1,4-cyclooctadiene, were recovered by vacuum distillation.

Example 4

A sample of the hydroperoxide (1.495 g., 0.0108 mole) was hydrogenated at atmospheric pressure with platinum oxide catalyst. A total of 0.591 liter (0.026 mole) of hydrogen was absorbed. The hydrogenated product, cyclooctanol, was oxidized with acidic dichromate solution to give cyclooctanone which was identified as a semicarbazone. The semicarbazone produced had a melting point of 167–171° C. as compared with the known semicarbazone having a melting point of 170–171° C.

Example 5

A sample of peroxidic oil (10.4 g.) in 100 ml. of absolute alcohol was charged to a 300 ml. glass reactor along with sponge nickel catalyst. The reactor was placed in a small rocker bomb and pressured to 100 p.s.i.g. hydrogen pressure at 75° F. At the end of 17 hours, the pressure had dropped to 20 p.s.i.g., the catalyst filtered off and the resultant solution evaporated. The material was further hydrogenated at atmospheric pressure using a platinum-on-carbon catalyst. A mixture of 1,2-dihydroxycyclooctane and 1,4-dihydroxycyclooctane was produced. The hydrogenated material was worked up as the acetate and a GPC analysis of this material indicated the two major components. The larger component was identical in retention time and infrared spectrum to trans-1,2-diacetoxycyclooctane. The smaller component agreed in retention time with that of cis-1,4-diacetoxycyclooctane.

The nature and objects of the present invention having been completely described and illustrated and the best mode thereof set forth.

What we wish to claim as new and useful and secure by Letters Patent is:

1. The compound, 3-hydroperoxy-1,5-cyclooctadiene.
2. The compound, 6-hydroperoxy-1,4-cyclooctadiene.
3. The method for producing 3-hydroperoxy-1,5-cyclooctadiene and 6-hydroperoxy-1,4-cyclooctadiene and a peroxidic oil which comprises:

contacting 1,5-cyclootadiene with molecular oxygen at a temperature within the range of about 50° to 75° C. whereby an oxidation mixture is formed;

distilling unreacted 1,5-cyclooctadiene from said oxidation mixture leaving an oil;

mixing said oil with a mixed solvent selected from the mixtures petroleum ether-benzene and petroleum ether-methanol wherein said petroleum ether is present in excess in the mixture;

cooling said oil and mixed solvent whereby said hydroperoxides are selectively dissolved in said mixed solvent forming a solvent and hydroperoxide phase and a peroxidic oil phase;

separating said solvent and hydroperoxide phase from the remaining peroxidic oil phase; and evaporating said solvent from the solvent and hydroperoxide phase to recover 3-hydroperoxy-1,5-cyclooctadiene and 6-hydroxyperoxy-1,4-cyclooctadiene.

4. The peroxidic oil produced according to claim 3.
5. A method in accordance with claim 3 wherein said mixed solvent is petroleum ether and benzene in a ratio of about 5:1 respectively.

References Cited

UNITED STATES PATENTS

| | | | |
|---|---|---|---|
| 2,497,349 | 2/1950 | Farkas et al. | 260—610 |
| 2,809,921 | 10/1957 | Vesely et al. | 260—610 |
| 2,863,882 | 12/1958 | Bain et al. | 260—610 |
| 3,171,864 | 3/1965 | Clement et al. | 260—610 |

FOREIGN PATENTS

| | | |
|---|---|---|
| 920,013 | 3/1963 | Great Britain. |

BERNARD HELFIN, *Acting Primary Examiner.*

LEON ZITVER, *Examiner.*

W. B. LONE, *Assistant Examiner.*